United States Patent
Tsai et al.

(10) Patent No.: US 10,495,957 B2
(45) Date of Patent: Dec. 3, 2019

(54) WAVELENGTH CONVERSION DEVICE AND PROJECTOR

(71) Applicant: Coretronic Corporation, Hsin-Chu (TW)

(72) Inventors: Te-Ying Tsai, Hsin-Chu (TW);
Tsung-Ching Lin, Hsin-Chu (TW);
Shi-Wen Lin, Hsin-Chu (TW);
Pei-Rong Wu, Hsin-Chu (TW);
Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/186,601

(22) Filed: Nov. 12, 2018

(65) Prior Publication Data

US 2019/0146316 A1 May 16, 2019

(30) Foreign Application Priority Data

Nov. 13, 2017 (CN) .......................... 2017 1 1111552

(51) Int. Cl.
G03B 21/16 (2006.01)
G03B 21/14 (2006.01)
G03B 21/20 (2006.01)

(52) U.S. Cl.
CPC ........... *G03B 21/16* (2013.01); *G03B 21/204* (2013.01)

(58) Field of Classification Search
CPC ........ G03B 21/14; G03B 21/204; H04N 9/31; H04N 9/3161; H04N 9/3144
USPC ........................................ 353/84, 54, 57, 61
See application file for complete search history.

(56) References Cited

U.S. PATENT DOCUMENTS

| 6,618,213 | B2 | 9/2003 | Inamoto |
| 7,018,051 | B2 | 3/2006 | Bok |
| 9,470,887 | B2 | 10/2016 | Tsai et al. |
| 10,145,541 | B2 * | 12/2018 | Yu .......................... F21V 17/002 |

(Continued)

FOREIGN PATENT DOCUMENTS

| CN | 102853377 | 1/2013 |
| CN | 204178109 | 2/2015 |

(Continued)

OTHER PUBLICATIONS

"Office Action of Taiwan Counterpart Application," dated May 18, 2019, p. 1-p. 8.

*Primary Examiner* — William C. Dowling
(74) *Attorney, Agent, or Firm* — JCIPRNET

(57) ABSTRACT

A wavelength conversion device includes a main body, at least one wavelength conversion layer, at least one heat dissipation plate, a heat conducting component and a driving unit. The wavelength conversion layer is disposed on the main body. The heat dissipation plate is disposed on a side of the main body with an interval. The heat conducting component is connected between the heat dissipation plate and the main body. The driving unit is connected to the main body and the heat dissipation plate and adapted to drive the main body and the heat dissipation plate to rotate. The driving unit and the heat conducting component have a gap therebetween. In addition, a projector including the wavelength conversion device is also provided. The wavelength conversion device according to the disclosure has good heat dissipation efficiency.

26 Claims, 7 Drawing Sheets

(56) References Cited

U.S. PATENT DOCUMENTS

| | | | | |
|---|---|---|---|---|
| 2004/0095767 | A1* | 5/2004 | Ohmae | ............... F21S 10/007 362/293 |
| 2007/0115438 | A1 | 5/2007 | Tsubura | |
| 2013/0169938 | A1 | 7/2013 | Huang | |
| 2017/0026624 | A1* | 1/2017 | Dai | ............... H04N 9/3144 |

FOREIGN PATENT DOCUMENTS

| | | |
|---|---|---|
| CN | 204420882 | 6/2015 |
| CN | 205003431 | 1/2016 |
| CN | 205750254 | 11/2016 |
| TW | I297418 | 6/2008 |
| TW | 200907546 | 2/2009 |
| TW | I530751 | 4/2016 |

\* cited by examiner

WAVELENGTH CONVERSION DEVICE AND PROJECTOR

CROSS-REFERENCE TO RELATED APPLICATION

This application claims the priority benefit of China application serial no. 201711111552.X, filed on Nov. 13, 2017. The entirety of the above-mentioned patent application is hereby incorporated by reference herein and made a part of this specification.

BACKGROUND OF THE INVENTION

1. Field of the Invention

The invention is related to an optical device and a projector, and particularly related to a wavelength conversion device and a projector having the wavelength conversion device.

2. Description of Related Art

Over the recent years, projection apparatus applying a solid-state light source such as light-emitting diodes (LEDs) and laser diodes gradually has become popular in the market. Since a lighting efficiency of the laser diode is about 20% higher than a lighting efficiency of the LED, in order to break through the limitation of the light source of the LED, a technique of using the laser light source to excite the phosphor powder to generate a pure color light source required by the projector is being developed increasingly. Moreover, the laser projection apparatus can use the laser beam provided by the laser diode to excite the phosphor powder to emit light as the illumination light source for the projector, so as to meet different brightness requirements of the projector. Therefore, the laser light source device serving as a light source system of the projector has great potential to replace a conventional high-pressure mercury lamp as a new generation of the light source of the projector.

For current laser projectors, generally, a reflective layer is formed on a metal substrate through coating, and a phosphor powder adhesive layer is coated on the reflective layer to constitute a phosphor wheel, and the laser beam emitted by the laser light source device excites the phosphor powder adhesive layer on the metal substrate of the phosphor wheel so as to generate light beam in different colors (such as green light and yellow light); and the laser beam (such as blue light) can directly pass through the phosphor wheel by going through a slot on the metal substrate or via a transparent plate disposed on the metal substrate, in order to generate light in multiple colors.

In order to enhance the heat dissipation efficiency of the phosphor wheel, a heat dissipation disk is disposed between the phosphor wheel of some projectors. The heat dissipation disk has openings, so current is driven by rotation of the phosphor wheel and the heat dissipation disk to flow into the space between the phosphor wheel and the heat dissipation disk through the openings. However, with the increasing energy density of the laser light source, the above design already cannot meet the heat dissipation requirements of the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The disclosure provides a wavelength conversion device having good heat dissipation efficiency.

The disclosure provides a projector whose wavelength conversion device has good heat dissipation efficiency.

Other purposes and advantages of the disclosure may be further understood with reference to technical features disclosed by the disclosure.

In order to achieve one, some or all of the above purposes or other purposes, the disclosure according to an embodiment provides a wavelength conversion device. The wavelength conversion device includes a main body, at least one wavelength conversion layer, at least one heat dissipation plate, at least one heat conducting component and a driving unit. The wavelength conversion layer is disposed on the main body. The heat dissipation plate is disposed on a side of the main body with an interval. The heat conducting component is connected between the heat dissipation plate and the main body. The driving unit is connected to the main body and the heat dissipation plate and adapted to drive the main body and the heat dissipation plate to rotate. The driving unit and the heat conducting component have a gap therebetween.

In order to achieve one, some or all of the above purposes or other purposes, the disclosure according to an embodiment provides a projector. The projector includes a laser light source device, a wavelength conversion device, a light valve, and a projection lens. The laser light source device is adapted to provide a laser beam. The wavelength conversion device includes a main body, at least one wavelength conversion layer, at least one heat dissipation plate, at least one heat conducting component and a driving unit. The wavelength conversion device is disposed on the main body and in a transmission path of the laser beam and adapted to convert a wavelength of the laser beam. The heat dissipation plate is disposed on a side of the main body with an interval. The heat conducting component is connected between the heat dissipation plate and the main body. The driving unit is connected to the main body and the heat dissipation plate and adapted to drive the main body and the heat dissipation plate to rotate. The driving unit and the heat conducting component have a gap therebetween. The light valve is disposed in the transmission path of the laser beam and adapted to convert the laser beam into an image light beam. The projector lens is disposed in a transmission path of the image light beam and adapted to convert the image light beam into a projection light beam.

In view of the above, the embodiments of the disclosure at least show one of the following advantages or effects. For the wavelength conversion device according to the disclosure, the heat conducting component is disposed between the main body and the heat dissipation plate. The main body is connected to the heat dissipation plate through the heat conducting component. In addition to dissipating heat through heat dissipation current between the main body and the heat dissipation plate, heat is conducted from the main body to the heat dissipation plate through the heat conducting component. Therefore, the heat dissipation plate is equal to an extended structure of the main body that increases a heat dissipation area significantly. In addition, the heat conducting component and the driving unit have a gap therebetween to prevent the heat conducting component from contacting the driving unit. The heat conducting component is deterred from conducting heat to the driving unit, so the driving unit does not become ineffective due to overheating.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
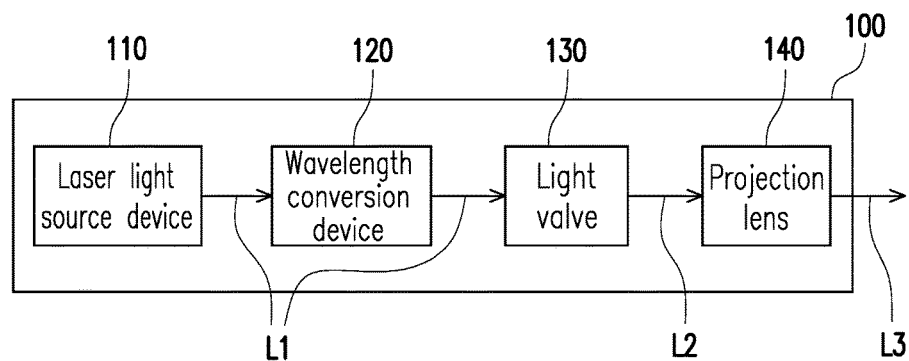
FIG. 1 is a schematic view of a projector according to an embodiment of the disclosure.

FIG. 1 is a schematic view of a projector according to an embodiment of the disclosure. Referring to FIG. 1, a projector 100 according to the embodiment of the disclosure includes a laser light source device 110, a wavelength conversion device 120, a light valve 130 and a projector lens 140. The laser light source device 110 is, for example, a laser light source, and is adapted to provide a laser beam L1. The wavelength conversion device 120 is, for example, a phosphor wheel, and located in a transmission path of the laser beam L1. The wavelength conversion device 120 is adapted to convert a wavelength of the laser beam L1 to produce a conversion light beam with different wavelengths during a first period. The wavelength conversion device 120 allows the laser beam L1 to pass through during a second period. The light valve 130 is located in transmission paths of the laser beam L1 and the conversion light beam and adapted to convert the laser beam L1 and the conversion light beam into an image light beam L2. The projector lens 140 is located in a transmission path of the image light beam L2 and adapted to convert the image light beam L2 into a projection light beam L3 and project the projector 100.

According to the embodiment of the disclosure, the laser light source device 100 that is used includes, for example, a laser diode (LD) and a laser diode bank. Specifically, light sources meeting the requirements for volume in realistic design all can be employed, but the disclosure is not limited to the embodiment.

According to the embodiment of the disclosure, the light valve 130 includes reflective light modulators such as a liquid crystal on silicon panel (LCoS panel) and a digital micro-mirror device (DMD). According to an embodiment of the disclosure, the light valve 130 includes transmissive light modulators such as a transparent liquid crystal panel, an electro-optical modulator, a maganeto-optic modulator and an acousto-optic modulator. However, the disclosure does not limit the format and type of the light valve 130. The detailed steps and implementation of a method of converting the laser beam and the conversion light beam into the image light beam through the light valve 130 may be taught, recommended and explained through common general knowledge, so no more details are provided.

According to the embodiment of the disclosure, the projector lens 140 includes, for example, a combination of one or more optical lens with diopters, particularly various combinations of non-planar lenses such as a biconcave lens, a biconvex lens, a concave-convex lens, a convex-concave lens, a plane-convex lens and a plane-concave lens. According to an embodiment of the disclosure, the projector lens 140 may also include a plane optical lens that is configured to convert an image light beam from the light valve 130 into the projection light beam and to project the projector in a reflective or transmissive manner. The disclosure does not limit the format and type of the projector lens 140.

Figure 2:
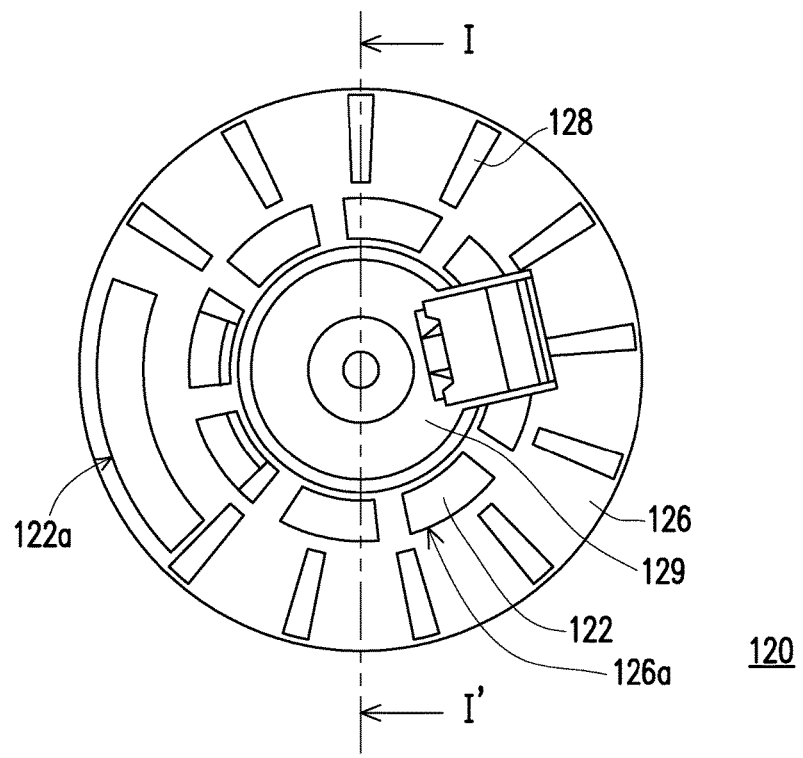
FIG. 2 is a rear view of a wavelength conversion device of FIG. 1.
Figure 3:
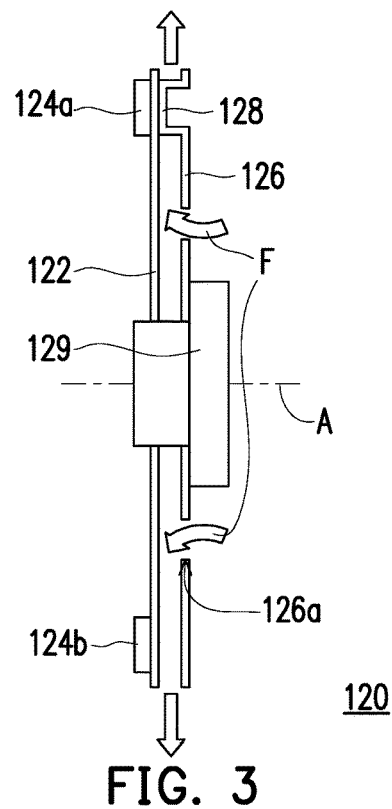
FIG. 3 is a cross-sectional view of the wavelength conversion device of FIG. 2 taken along a line I-I.

FIG. 2 is a rear view of the wavelength conversion device of FIG. 1. FIG. 3 is a cross-sectional view of the wavelength conversion device of FIG. 2 taken along a line I-I. Referring to FIGS. 2 and 3, the wavelength conversion device 120 according to the embodiment of the disclosure includes a main body 122, at least one wavelength conversion layer (wavelength conversion layers 124a and 124b are shown), at least one heat dissipation plate 126 (one heat dissipation plate is shown), at least one heat conducting component 128 (many heat conducting components are shown) and a driving unit 129. The wavelength conversion layers 124a and 124b are, for example, phosphor powder adhesive layers, disposed on the main body 122 and in the transmission path of the laser beam L1 (shown in FIG. 1) and adapted to convert a wavelength of the laser beam L1 and to produce conversion light beams with different wavelengths. The main body 122 is, for example, a disk-shaped substrate and includes a light penetration area 122a. The material of the light penetration area 122a may be glass and include an anti-reflection layer. In another embodiment of the disclosure, the light penetration area 122a may be a hollow area on the main body 122, but the disclosure is not limited to the embodiment.

The driving unit 129 is, for example, a motor that is connected to a central axis A of the main body 122 and the heat dissipation plate 126 and adapted to drive the main body 122 and the heat dissipation plate 126 to rotate around the central axis A that serves as a rotation axis. When the main body 122 rotates, the wavelength conversion layers 124a and 124b and the light penetration area 122a are driven sequentially to move in the transmission path of the laser beam L shown in FIG. 1. The wavelength conversion layer 124a is adapted to convert the laser beam L1 (such as blue light) shown in FIG. 1 into a first conversion light beam (such as green light) with a first wavelength. The wavelength conversion layer 124b is adapted to convert the laser beam L1 shown in FIG. 1 into a second conversion light beam (such as yellow light) with a second wavelength. However, the color of the conversion light beam is not limited to the embodiment. The first wavelength differs from the second wavelength, and the first wavelength and the second wavelength both differ from a wavelength of the laser beam L1 that does not pass through the wavelength conversion device 120. The laser beam L1 may also directly penetrate the main body 122 through the light penetration area 122a on the main body 122. In this regard, the laser light beam L1 may produce the conversion light beams in various colors after passing through the wavelength conversion device 120.

The heat dissipation plate 126 is, for example, disk-shaped, and disposed on a side of the main body 122 with an interval. The heat conducting component 128 is, for example, a protrusion portion that is formed by employing a stamping process on the heat dissipation plate 126 and protrudes toward the main body 122. The heat conducting component 128 is integrated to be connected to the heat dissipation plate 126. When the main body 122 and the heat dissipation plate 126 rotate, heat dissipation current F flows in a space between the main body 122 and the heat dissipation plate 126 to dissipate heat. In addition, the heat conducting component 128 is connected between the heat dissipation plate 126 and the main body 122, and the driving unit 129 and the heat conducting component 128 have a gap therebetween. In this regard, in addition to dissipating heat through the heat dissipation current F between the main body 122 and the heat dissipation plate 126, heat is conducted from the main body 122 to the heat dissipation plate 126 through the heat conducting component 128. The heat dissipation plate 126 is equal to an extended structure of the main body 122 that increases a heat dissipation area significantly. In addition, the heat conducting component 128 and the driving unit 129 have the gap therebetween to prevent the heat conducting component 128 from contacting the driving unit 129. The heat conducting component 128 is deterred from conducting heat to the driving unit 129, so the driving unit 129 does not become ineffective due to overheating.

According to the embodiment of the disclosure, the heat dissipation plate 126 includes at least one opening 126a (many openings are shown in FIG. 2), and the heat dissipation current F flows in the space between the main body 122 and the heat dissipation plate 126 through the opening 126a. The opening 126a is, for example, located between the heat conducting component 128 and the driving unit 129. Therefore, after the heat dissipation current F enters the space between the heat dissipation plate 126 and the main body 122 through the opening 126a, the heat dissipation current F flowing along the main body 122 and the heat dissipation plate 126 flows past the heat conducting component 128. Specifically, the heat conducting components 128 are disposed with intervals in a circumference direction, and the openings 126a are disposed with intervals in a circumference direction. In another embodiment of the disclosure, the heat conducting component 128 and the opening 126a may be disclosed in different ways, but the disclosure is not limited to the embodiment.

According to the embodiment of the disclosure, the heat dissipation plate 126 as shown in FIG. 2 has a diameter the same as or similar to a diameter of the main body 122. The heat conducting component 128 as shown in FIG. 3 is aligned to the wavelength conversion layers 124a and 124b. In other words, the heat conducting component 128 and the wavelength conversion layers 124a and 124b contact corresponding positions of opposite sides of the main body 122 respectively to dissipate heat from the high-temperature wavelength conversion layers 124a and 124b efficiently. However, according to another embodiment of the disclosure, the heat conducting component 128 may not be aligned to the wavelength conversion layers 124a and 124b. The disclosure is not limited to the embodiment. In addition, a distance in a direction that is parallel to the rotation axis between the heat dissipation plate 126 and the main body 122 according to the embodiment of the disclosure is twenty times less than a thickness of the main body in the direction, so good effects of heat dissipation arise. However, the disclosure is not limited to the embodiment.

Figure 4:
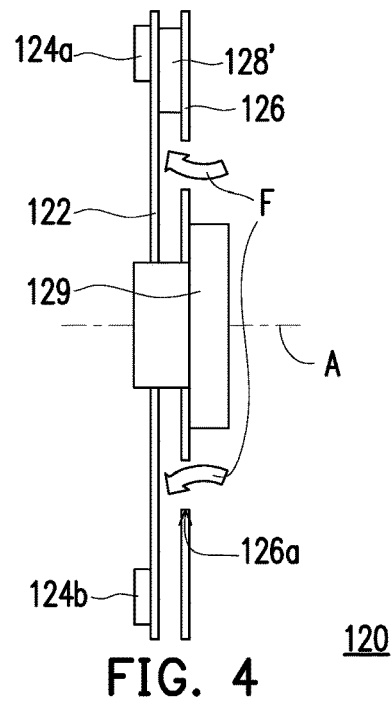
FIG. 4 is a cross-sectional view of a wavelength conversion device according to another embodiment of the disclosure.

FIG. 4 is a rear view of a wavelength conversion device according to another embodiment of the disclosure. The difference in the embodiment between FIGS. 3 and 4 is that a heat conducting component 128' is not integratedly formed with the heat dissipation plate 126. The material of the heat dissipation component 128' is, for example, a highly heat conducting medium that enhances the efficiency of thermal conduction. The heat conducting component 128' is, for example, connected to the main body 122 and the heat dissipation plate 126 respectively through welding, bonding or other appropriate ways, but the disclosure is not limited to the embodiment.

Figure 5:
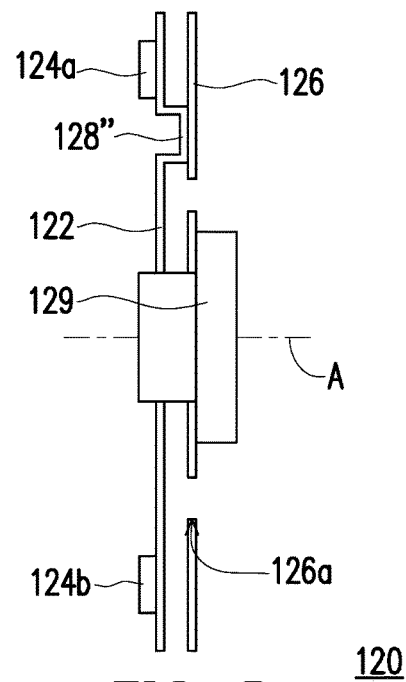
FIG. 5 is a cross-sectional view of a wavelength conversion device according to another embodiment of the disclosure.

FIG. 5 is a cross-sectional view of a wavelength conversion device according to another embodiment of the disclosure. The difference in the embodiment between FIGS. 3 and 5 is that the heat conducting component 128" is integratedly formed with the main body 122 rather than the heat dissipation plate 126. The heat conducting component 128" is, for example, a protrusion portion that is formed by employing a stamping process on the main body 122 and protrudes toward the heat dissipation plate 126. The heat conducting component 128" is integrated to be connected to the main body 122. According to the embodiment of the disclosure, the heat conducting component 128" as shown in FIG. 5 is disposed in neighboring positions beside the wavelength conversion layers 124*a* and 124*b* to efficiently conduct heat from the wavelength conversion layers 124*a* and 124*b* to the heat dissipation plate 126 through the heat conducting component 128" to dissipate heat.

Figure 6:
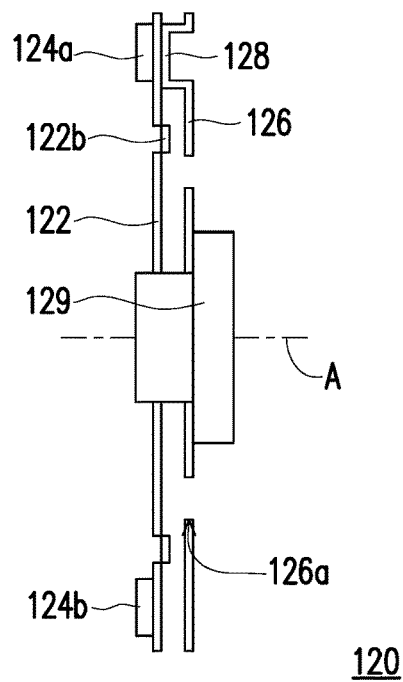
FIG. 6 is a cross-sectional view of a wavelength conversion device according to another embodiment of the disclosure.

FIG. 6 is a cross-sectional view of a wavelength conversion device according to another embodiment of the disclosure. The difference in the embodiment between FIGS. 3 and 6 is that the main body 122 includes at least one turbulence structure 122*b* (many concave-convex structures are shown). The turbulence structure 122*b* may be, for example, a protrusion portion on the main body 122 protruding toward the heat dissipation plate 126 without contacting the heat dissipation plate 126. After current enters the space between the heat dissipation plate 126 and the main body 122 through the opening 126*a*, the turbulence structure 122*b* may create turbulence for the current flowing past the turbulence structure 122*b* to enhance heat dissipation efficiency.

Figure 7:
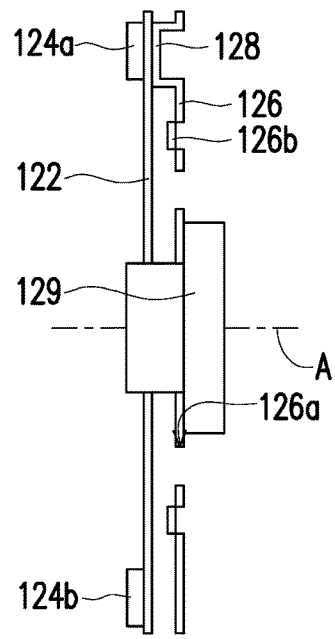
FIG. 7 is a cross-sectional view of a wavelength conversion device according to another embodiment of the disclosure.

FIG. 7 is a cross-sectional view of a wavelength conversion device according to another embodiment of the disclosure. The main difference in the embodiment between FIGS. 3 and 7 is that the main body 122 does not include a turbulence structure. The heat dissipation plate 126 includes at least one turbulence structure 126*b* (shown as a concave-convex structure). The turbulence structure 126*b* may be, for example, a protrusion portion on the heat dissipation plate 126 protruding toward the main body 122 without contacting the main body 122. After current enters the space between the heat dissipation plate 126 and the main body 122 through the opening 126*a*, the turbulence structure 126*b* may create turbulence for the current flowing past the turbulence structure 126*b* to enhance heat dissipation efficiency.

Figure 8:
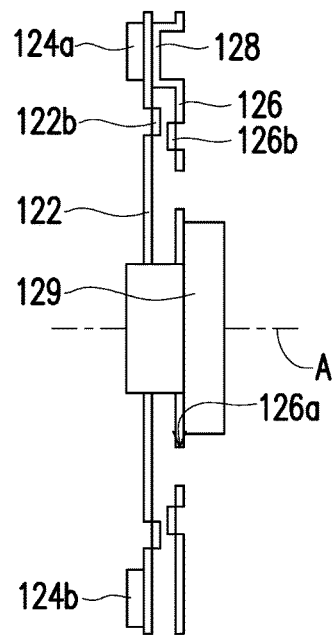
FIG. 8 is a cross-sectional view of a wavelength conversion device according to another embodiment of the disclosure.

FIG. 8 is a cross-sectional view of a wavelength conversion device according to another embodiment of the disclosure. The difference in the embodiment between FIGS. 3 and 8 is that the main body 122 includes the at least one turbulence structure 122*b* (shown as the concave-convex structure) that does not contact the heat dissipation plate 126. The heat dissipation plate 126 includes the at least one the turbulence structure 126*b* (shown as the concave-convex structure) that does not contact the main body 122. After current enters the space between the heat dissipation plate 126 and the main body 122 through the opening 126*a*, the turbulence structures 122*b* and 126*b* may create turbulence for the current flowing past the turbulence structures 122*b* and 126*b* to enhance heat dissipation efficiency.

Figure 9:
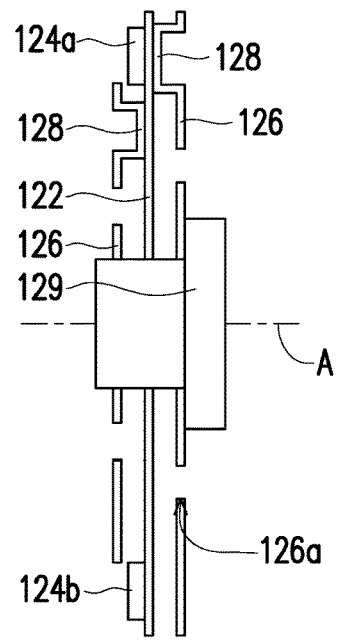
FIG. 9 is a cross-sectional view of a wavelength conversion device according to another embodiment of the disclosure.

FIG. 9 is a cross-sectional view of a wavelength conversion device according to another embodiment of the disclosure. The differences in the embodiment between FIGS. 3 and 9 are that the at least one heat dissipation plate 126 includes the two heat dissipation plates 126 and that the at least one heat conducting component 128 includes the two heat conducting components 128. The two heat dissipation plates 126 are disposed on opposite sides of the main body 122 respectively with intervals. The driving unit 129 is adapted to drive the main body 122 and the two heat dissipation plates 126 to rotate around the central axis A that serves as the rotation axis. Each of the heat conducting components 128 is connected between the main body 122 and the corresponding heat dissipation plate 126. The heat conducting component 128 of one of the heat dissipation plates 126 is aligned to the wavelength conversion layers 124*a* and 124*b* on the main body 122, while the heat conducting component 128 of the other heat dissipation plate 126 is disposed in a neighboring position beside the wavelength conversion layers 124*a* and 124*b* to enhance heat dissipation efficiency.

Figure 10:
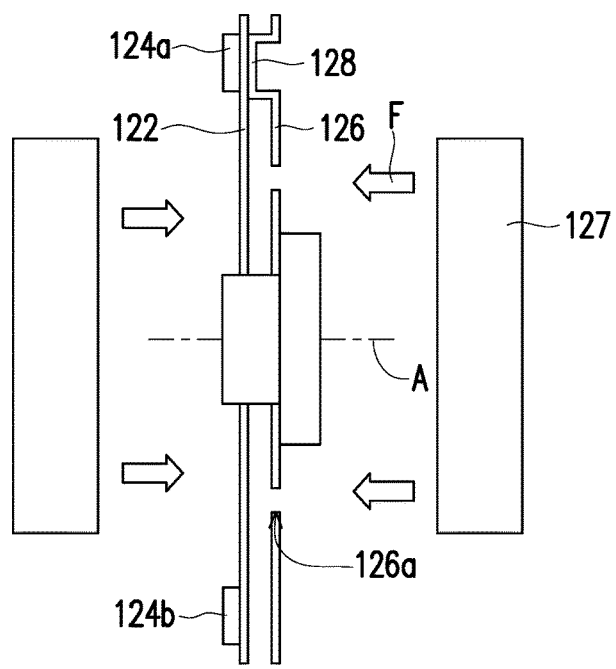
FIG. 10 is a cross-sectional view of a wavelength conversion device according to another embodiment of the disclosure.

FIG. 10 is a cross-sectional view of a wavelength conversion device according to another embodiment of the disclosure. The difference in the embodiment between FIGS. 3 and 10 is that the wavelength conversion device further includes at least one fan 127 (two fans are shown). The two fans 127 are disposed on opposite sides of the wavelength conversion device respectively and configured to provide the heat dissipation current F for the main body 122 and the heat dissipation plate 126 respectively to enhance heat dissipation efficiency.

Figure 11:
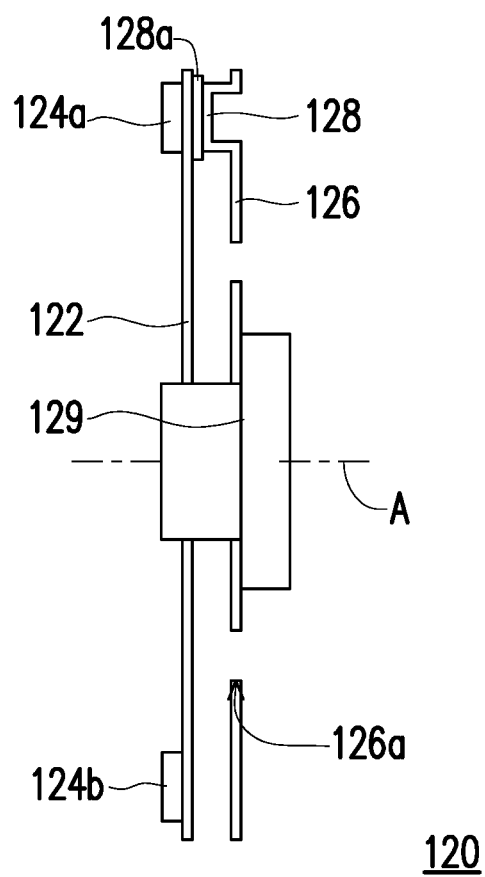
FIG. 11 is a cross-sectional view of a wavelength conversion device according to another embodiment of the disclosure.

FIG. 11 is a cross-sectional view of a wavelength conversion device according to another embodiment of the disclosure. The difference in the embodiment between FIGS. 3 and 11 is that the heat conducting component 128 is bonded to the main body 122 through a heat conducting medium 128*a*. The heat conducting medium 128*a* is a colloid with high thermal conductivity. The heat conducting component 128 is, for example, a protrusion portion that is formed by employing a stamping process on the heat dissipation plate 126 and protrudes toward the main body 122. Moreover, the heat conducting medium 128*a* is filled between the heat conducting component 128 and the main body 122, so the heat conducting component 128 may be connected to the main body 122 through the heat conducting medium 128*a* to dissipate heat from the main body 122. According to another embodiment of the disclosure, the heat conducting component 128 may be a protrusion portion that is formed by employing a stamping process on the main body 122 and protrudes toward the heat dissipation plate 126, and the heat conducting medium 128*a* is filled between the heat conducting component 128 and the heat dissipation plate 126. However, the disclosure is not limited to the embodiment.

Figure 12:
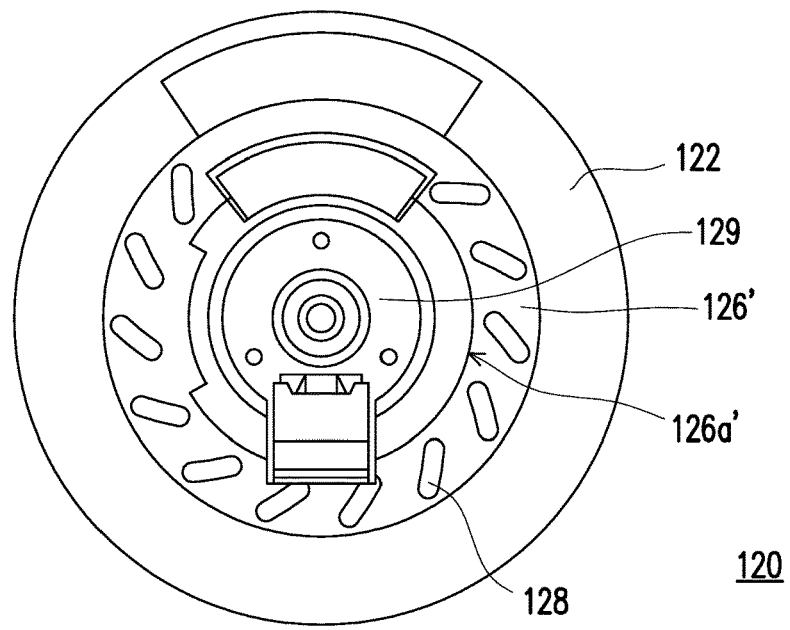
FIG. 12 is a rear view of a wavelength conversion device according to another embodiment of the disclosure.

FIG. 12 is a rear view of a wavelength conversion device according to another embodiment of the disclosure. The difference in the embodiment between FIGS. 2 and 12 is that a heat dissipation plate 126' of the wavelength conversion device 120 according to the embodiment of the disclosure has a smaller diameter than the main body 122. The number of the openings 126*a*' of the heat dissipation plate 126' is one. Moreover, the opening 126*a*' is an annular opening. In other words, the heat dissipation plate 126' may be, for example, an annular component, and connected to the main body 122 through the heat conducting component 128. The annular opening 126*a*' is located between the heat conducting component 128 and the driving unit 129. Current flows in the space between the main body 122 and the heat dissipation plate 126' through the annular opening 126a'.

Figure 13:
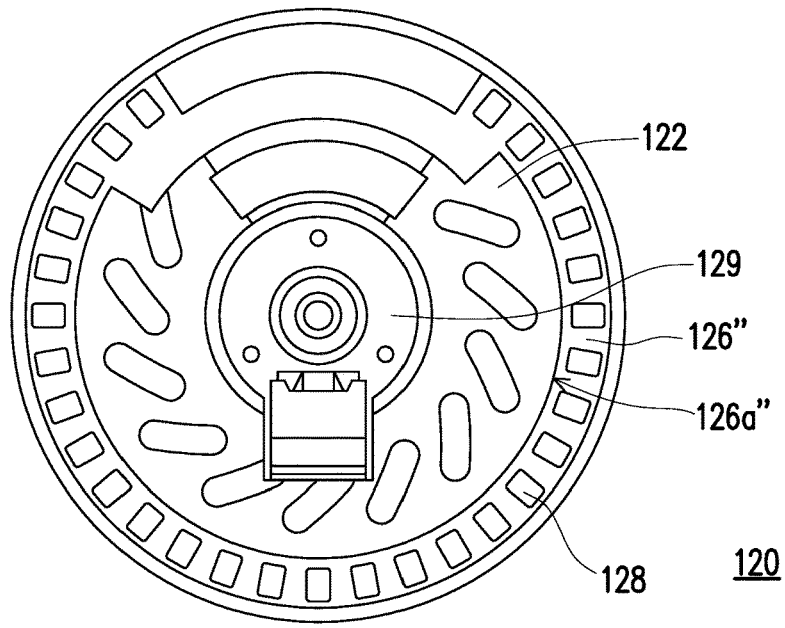
FIG. 13 is a rear view of a wavelength conversion device according to another embodiment of the disclosure.

FIG. 13 is a rear view of a wavelength conversion device according to another embodiment of the disclosure. The difference in the embodiment between FIGS. 2 and 13 is that a heat dissipation plate 126" of the wavelength conversion device 120 according to the embodiment of the disclosure has a diameter the same as or similar to a diameter the main body 122. The number of the opening 126a" of the heat dissipation plate 126" is one. Moreover, the opening 126a" is an annular opening. In other words, the heat dissipation plate 126" may be, for example, an annular component, and connected to the main body 122 through the heat conducting component 128. The opening 126a" is located between the heat conducting component 128 and the driving unit 129. Current flows in the space between the main body 122 and the heat dissipation plate 126" through the annular opening 126a".

In view of the foregoing, the embodiments of the disclosure include at least one of the following advantages or effects. For the wavelength conversion according to the embodiments of the disclosure, the heat conducting component is disposed between the main body and the heat dissipation plate, and the main body is connected to the heat dissipation plate through the heat conducting component. In this regard, in addition to dissipating heat through the heat dissipation current between the main body and the heat dissipation plate, heat is conducted from the main body to the heat dissipation plate through the heat conducting component. In this regard, the heat dissipation plate is equal to an extended structure of the main body that increases a heat dissipation area significantly. In addition, the heat conducting component and the driving unit have a gap therebetween to prevent the heat conducting component from contacting the driving unit. The heat conducting component is deterred from conducting heat to the driving unit, so the driving unit does not become ineffective due to overheating. Further, as mentioned above, the embodiments of the disclosure suggest that the heat conducting component enhances the heat dissipation efficiency of the wavelength conversion device, so it is needless to enlarge sizes of the main body and the heat dissipation plate in order to increase the heat dissipation area. Instead, the space inside the projector is spared, and the volume of the projector is reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, comprising: a main body, at least one wavelength conversion layer, at least one heat dissipation plate, at least one heat conducting component and a driving unit,
   wherein the at least one wavelength conversion layer is disposed on the main body;
   the at least one heating dissipation plate is disposed on a side of the main body with an interval;
   the at least one heat conducting component is connected between the heat dissipation plate and the main body; and
   the driving unit is connected to the main body and the at least one heat dissipation plate and adapted to drive the main body and the at least one heat dissipation plate to rotate, wherein the driving unit and the at least one heat conducting component have a gap therebetween.

2. The wavelength conversion device of claim 1, wherein at least one of the main body and the at least one heat dissipation component comprises at least one opening.

3. The wavelength conversion device of claim 2, wherein the at least one opening is disposed between the at least one heat conducting component and the driving unit.

4. The wavelength conversion device of claim 3, wherein the main body and the at least one heat dissipation plate are disk-shaped, the number of the at least one heat conducting component is plural, the plurality of heat conducting components are disposed in a circumference direction with intervals, the number of the at least one opening is plural, and the plurality of openings are disposed in a circumference direction with intervals.

5. The wavelength conversion device of claim 1, wherein the at least one heat conducting component is aligned to the wavelength conversion layer.

6. The wavelength conversion device of claim 1, wherein the at least one heat conducting component is integrated to be connected to at least one of the main body and the at least one heat dissipation plate.

7. The wavelength conversion device of claim 1, wherein the at least one heat conducting component is not integrated to be connected to the main body and the at least one heat dissipation plate.

8. The wavelength conversion device of claim 1, wherein at least one of the main body and the at least one heat dissipation plate comprises at least one turbulence structure.

9. The wavelength conversion device of claim 1, wherein the at least one heat dissipation plate comprises two heat dissipation plates, the at least one heat conducting component comprises two heat conducting components, the two heat dissipation plates are disposed on opposite sides of the main body respectively with intervals, and each of the two heat conducting components is connected between the main body and the corresponding heat dissipation plate.

10. The wavelength conversion device of claim 1, wherein the main body and the at least one heat dissipation plate are disk-shaped, the driving unit is connected to a central axis of the main body and the at least one heat dissipation plate and adapted to drive the main body and the at least one heat dissipation plate to rotate around the central axis serving as a rotation axis, and a distance in a direction parallel to the rotation axis between the at least one heat dissipation plate and the main body is twenty times less than a thickness of the main body in the direction.

11. The wavelength conversion device of claim 1, wherein the wavelength conversion device further comprises a fan that is adapted to provide heat dissipation current for the main body and the at least one heat dissipation plate.

12. The wavelength conversion device of claim 1, wherein the at least one heat conducting component is connected to the main body or the heat dissipation plate through a heat conducting medium.

13. The wavelength conversion device of claim 2, wherein the main body and the at least one heat dissipation plate are disk-shaped, the number of the at least one opening of the heat dissipation plate is one, the opening is annular and disposed between the at least one heat conducting component and the driving unit.

14. A projector, comprising a laser light source device, a wavelength conversion device, a light valve and a projection lens,
wherein the laser light source device is adapted to provide a laser beam;
the wavelength conversion device, comprising: a main body, at least one wavelength conversion layer, at least one heat dissipation plate, at least one heat conducting component and a driving unit;
wherein the at least one wavelength conversion layer is disposed on the main body and in a transmission path of the laser beam, and the at least one wavelength conversion layer is adapted to convert a wavelength of the laser beam;
the at least one heat dissipation plate is disposed on a side of the main body with an interval;
the at least one heat conducting component is connected between the at least one heat dissipation plate and the main body; and
the driving unit is connected to the main body and the at least one heat dissipation plate and adapted to drive the main body and the at least one heat dissipation plate to rotate, wherein the driving unit and the at least one heat conducting component have a gap therebetween;
the light valve is disposed in the transmission path of the laser beam and adapted to convert the laser beam into an image light beam; and
the projector lens is disposed in a transmission path of the image light beam and adapted to convert the image light beam into a projection light beam.

15. The projector of claim 14, wherein at least one of the main body and the at least one heat dissipation plate comprises at least one opening.

16. The projector of claim 15, wherein the at least one opening is disposed between the at least one heat conducting component and the driving unit.

17. The projector of claim 16, wherein the main body and the at least one heat dissipation plate are disk-shaped, the number of the at least one heat conducting component is plural, the plurality of heat conducting components are disposed in a circumference direction with intervals, the number of the at least one opening is plural, and the plurality of openings are disposed in a circumference direction with intervals.

18. The projector of claim 14, wherein the at least one heat conducting component is aligned to the wavelength conversion layer.

19. The projector of claim 14, wherein the at least one heat conducting component is integrated to be connected to at least one of the main body and the at least one heat dissipation plate.

20. The projector of claim 14, wherein the at least one heat conducting component is not integrated to be connected to the main body and the at least one heat dissipation plate.

21. The projector of claim 14, wherein at least one of the main body and the at least one heat dissipation plate comprises at least one turbulence structure.

22. The projector of claim 14, wherein the at least one heat dissipation plate comprises two heat dissipation plates, the at least one heat conducting component comprises two heat conducting components, the two heat dissipation plates are disposed on opposite sides of the main body respectively with intervals, and each of the two heat conducting components is connected between the main body and the corresponding heat dissipation plate.

23. The projector of claim 14, wherein the main body and the at least one heat dissipation plate are disk-shaped, the driving unit is connected to a central axis of the main body and the at least one heat dissipation plate and adapted to drive the main body and the at least one heat dissipation plate to rotate around the central axis serving as a rotation axis, and a distance in a direction parallel to the rotation axis between the at least one heat dissipation plate and the main body is twenty times less than a thickness of the main body in the direction.

24. The projector of claim 14, wherein the wavelength conversion device further comprises at least one fan that is adapted to provide heat dissipation current for the main body and the at least one heat dissipation plate.

25. The projector of claim 14, wherein the at least one heat conducting plate is connected to the main body or the heat dissipation plate through a heat conducting medium.

26. The projector of claim 15, wherein the main body and the at least one heat dissipation plate are disk-shaped, the number of the at least one opening of the heat dissipation plate is one, and the opening is annular and disposed between the at least one heat conducting component and the driving unit.

* * * * *